US008645828B2

(12) United States Patent
Avery et al.

(10) Patent No.: US 8,645,828 B2
(45) Date of Patent: Feb. 4, 2014

(54) MANAGEMENT SYSTEM FOR A CONTACT CENTER

(75) Inventors: Brett Andrew Avery, Satur Via Scone (AU); Eldon Chun-Keung Wong, Eastwood (AU); Ihab Nakhla, Sylvania (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 0 days.

(21) Appl. No.: 10/250,707

(22) PCT Filed: Jan. 8, 2002

(86) PCT No.: PCT/AU02/00021
§ 371 (c)(1),
(2), (4) Date: Dec. 8, 2003

(87) PCT Pub. No.: WO02/054271
PCT Pub. Date: Jul. 11, 2002

(65) Prior Publication Data
US 2004/0088300 A1 May 6, 2004

(30) Foreign Application Priority Data
Jan. 8, 2001 (AU) .................................... PR2428

(51) Int. Cl.
*G06F 3/00* (2006.01)
(52) U.S. Cl.
USPC .... 715/704; 715/226; 707/781; 707/999.002; 707/999.006
(58) Field of Classification Search
USPC .............. 707/6, 100, 101, 102, 103 R, 104.1; 370/252, 346; 705/10
See application file for complete search history.

(56) References Cited

U.S. PATENT DOCUMENTS

| 5,384,910 | A | | 1/1995 | Torres |
| 5,404,528 | A | | 4/1995 | Mahajan |
| 5,446,874 | A | * | 8/1995 | Waclawsky et al. ............... 714/1 |
| 5,465,358 | A | * | 11/1995 | Blades et al. .................. 715/707 |
| 5,526,357 | A | * | 6/1996 | Jandrell ......................... 370/346 |
| 5,528,677 | A | | 6/1996 | Butler et al. |
| 5,588,003 | A | * | 12/1996 | Ohba et al. ..................... 370/468 |

(Continued)

FOREIGN PATENT DOCUMENTS

| CA | 2294813 | 1/1999 |
| EP | 1017216 A2 | 5/2000 |

(Continued)

OTHER PUBLICATIONS

Anonymous: *WordPerfect Office2000: PerfectScript and Macro User Guide*, Internet Article, [On-line] 1999, XP002460934 Retrieved from the Internet: URL:http://www.jdan.com/perfectscript/macro9en.pdf.

*Primary Examiner* — Sangwoo Ahn
(74) *Attorney, Agent, or Firm* — Nixon Peabody LLP

(57) ABSTRACT

An application management system, including a learning robot/learning agent adapted to generate control data (eg automation script) by monitoring interactions (404,406) between a customer service application (CSA) and a user of the application and an execution robot for sending application data to the application on the basis of the control data, is described. A contact center management system whose components are configurable by a contact center administrator is also described. A relationship management system that manages a relationship between a business requiring a contact center and a customer service representative broker is also described.

46 Claims, 7 Drawing Sheets

(56) References Cited

U.S. PATENT DOCUMENTS

| | | | |
|---|---|---|---|
| 5,642,410 A | 6/1997 | Walsh et al. | |
| 5,649,107 A * | 7/1997 | Kim et al. | 709/224 |
| 5,655,014 A | 8/1997 | Walsh et al. | |
| 5,655,015 A | 8/1997 | Walsh et al. | |
| 5,812,826 A * | 9/1998 | McLain, Jr. | 703/27 |
| 5,841,854 A | 11/1998 | Schumacher et al. | |
| 5,898,772 A | 4/1999 | Connors et al. | |
| 5,956,024 A | 9/1999 | Strickland et al. | |
| 5,960,174 A * | 9/1999 | Dew | 709/208 |
| 5,963,635 A | 10/1999 | Szlam et al. | |
| 6,021,403 A | 2/2000 | Horvitz et al. | |
| 6,047,261 A | 4/2000 | Siefert | |
| 6,170,011 B1 | 1/2001 | Macleod Beck et al. | |
| 6,192,380 B1 * | 2/2001 | Light et al. | 715/207 |
| 6,236,977 B1 * | 5/2001 | Verba et al. | 705/10 |
| 6,363,411 B1 * | 3/2002 | Dugan et al. | 709/202 |
| 6,654,798 B1 * | 11/2003 | Skibinski et al. | 709/220 |
| 6,697,858 B1 * | 2/2004 | Ezerzer et al. | 709/224 |
| 6,711,565 B1 * | 3/2004 | Subramaniam et al. | 707/3 |
| 6,760,324 B1 * | 7/2004 | Scott et al. | 370/352 |
| 6,791,974 B1 * | 9/2004 | Greenberg | 370/352 |
| 6,842,737 B1 * | 1/2005 | Stiles et al. | 705/6 |
| 2001/0040590 A1 * | 11/2001 | Abbott et al. | 345/700 |
| 2004/0205530 A1 * | 10/2004 | Borg | 715/507 |

FOREIGN PATENT DOCUMENTS

| | | |
|---|---|---|
| WO | WO 96/28778 A1 | 9/1996 |
| WO | WO 98/17048 A1 | 4/1998 |
| WO | WO 98/57286 A1 | 12/1998 |
| WO | WO 99/01831 | 1/1999 |
| WO | WO 99/04547 | 1/1999 |
| WO | WO 99/20060 | 4/1999 |
| WO | WO 99/23591 | 5/1999 |
| WO | WO 00/50136 | 8/2000 |
| WO | WO 00/68769 | 11/2000 |
| WO | WO 01/82195 | 11/2001 |

* cited by examiner

MANAGEMENT SYSTEM FOR A CONTACT CENTER

The present invention relates to a management system for use in forming a contact centre, a system and method for controlling access to an application, and to a system and method for managing the relationship between parties using a contact centre.

Large businesses have traditionally created call centres to handle telephone enquiries, telesales, service requests, and complaints from their customers. A contact centre is the modern equivalent of the call centre, providing access through the Internet in addition to the traditional telephone service. The Internet allows a business contact centre to provide customer service by a wide variety of means, including web-based forms and information pages, email, voice-over-IP (VoIP), internet relay chat (IRC) and streaming video. However, contact centres can be difficult and expensive to create and manage. Moreover, the dynamic nature of businesses today means that the needs of their customers are also dynamic. To service their customers, businesses may find that they need to create a new contact centre, hire and train customer service representatives, and bring the centre online, all at short notice. Even businesses with existing call centres may need to enlarge them for a short period of time—just after a new product release, for example—and then subsequently re-dimension them again by reducing their size some time later.

The operation of a call centre typically involves a large number of relationships between the various parties involved. In particular, the staffing of a call centre with customer service representatives may involve direct recruitment, or indirect recruitment through engaging the services of one or more customer service representative brokers. The maintenance of these relationships and up-to-date information on the various parties can be complex, time-consuming and expensive.

Customer service representatives working in call centres utilise customer and product/service information to effectively serve customers. Consequently, the customer service representatives are given access to the database applications used within the business that provide the necessary information. These applications can be partially integrated in the call centre by computer telephony integration (CTI). For example, when a customer telephones the call centre, CTI provides the customer's telephone number to a database application which can use the n umber to automatically retrieve the customer's records for the customer service representative. However, this requires the database application to support CTI, and the customer service representative to be physically present in a contact centre equipped with CTI infrastructure. Moreover, the database application may be distinct from the application used to service customers, and the process of integrating the two may be difficult and time-consuming.

It is desired, therefore, to provide a method and system for controlling access to an application, a system and method for managing the relationship between parties using a contact centre, and a contact centre management system that alleviate one or more of the above difficulties, or at least provide a useful alternative.

In accordance with the present invention there is provided a method for sending application data to an application, including generating control data by monitoring interactions between said application and a user of said application; and sending application data to said application on the basis of said control data.

The present invention also provides a method for extracting application data from output of an application, including generating control data by monitoring interactions between said application and a user of said application; and extracting application data from output of said application on the basis of said control data.

The present invention also provides a method for extracting data from an application, including:

generating control data by monitoring interactions between said application and a user of said application;

sending first application data to said application on the basis of said control data; and extracting second application data from output of said application on the basis of said control data.

The present invention also provides a method for transferring application data from a first application to a second application, including:

generating first control data by monitoring interactions between said first application and a user of said first application;

generating second control data by monitoring interactions between said second application and a user of said second application;

extracting application data from output of said first application on the basis of said first control data; and sending said application data to said second application on the basis of said second control data.

The present invention also provides a method for sending application data to an application, including sending, to a computer system hosting said application, a learning robot adapted to generate control data by monitoring interactions between said application and a user of said application; and sending application data to said application on the basis of said control data.

The present invention also provides an application management system, including a learning robot adapted to generate control data by monitoring interactions between an application and a user of said application;

an execution robot for sending application data to said application on the basis of said control data.

The present invention also provides a management system, including:

an access component for obtaining access data for connecting to a system of a business adapted to execute an application;

a learning robot for monitoring execution of events to use said application; and an execution robot adapted to provide remote access to said application on the basis of said access data and said events.

The present invention also provides a method for configuring access to an application, including:

receiving at a server interface access data for connecting to a business system adapted to execute the application;

transmitting to the business system a learning robot adapted to monitor operating system events generated during use of the application; and remotely accessing and executing the application on the basis of said access data and said events.

The present invention also provides a management system for a contact centre, including:

an interface for receiving configuration data from an administrator of said contact centre;

a database for storing said configuration data; and a configuration component adapted to configure components of a contact centre on the basis of said configuration data.

The present invention also provides a relationship management system, including:

a messaging component for receiving and sending relationship data between parties involved in operating a contact centre; and a database component for maintaining profile data on said parties, said profile data including association data representing associations established between said parties.

Preferred embodiments of the present invention are hereinafter described, by way of example only, with reference to the accompanying drawings, wherein.

Figure 6:
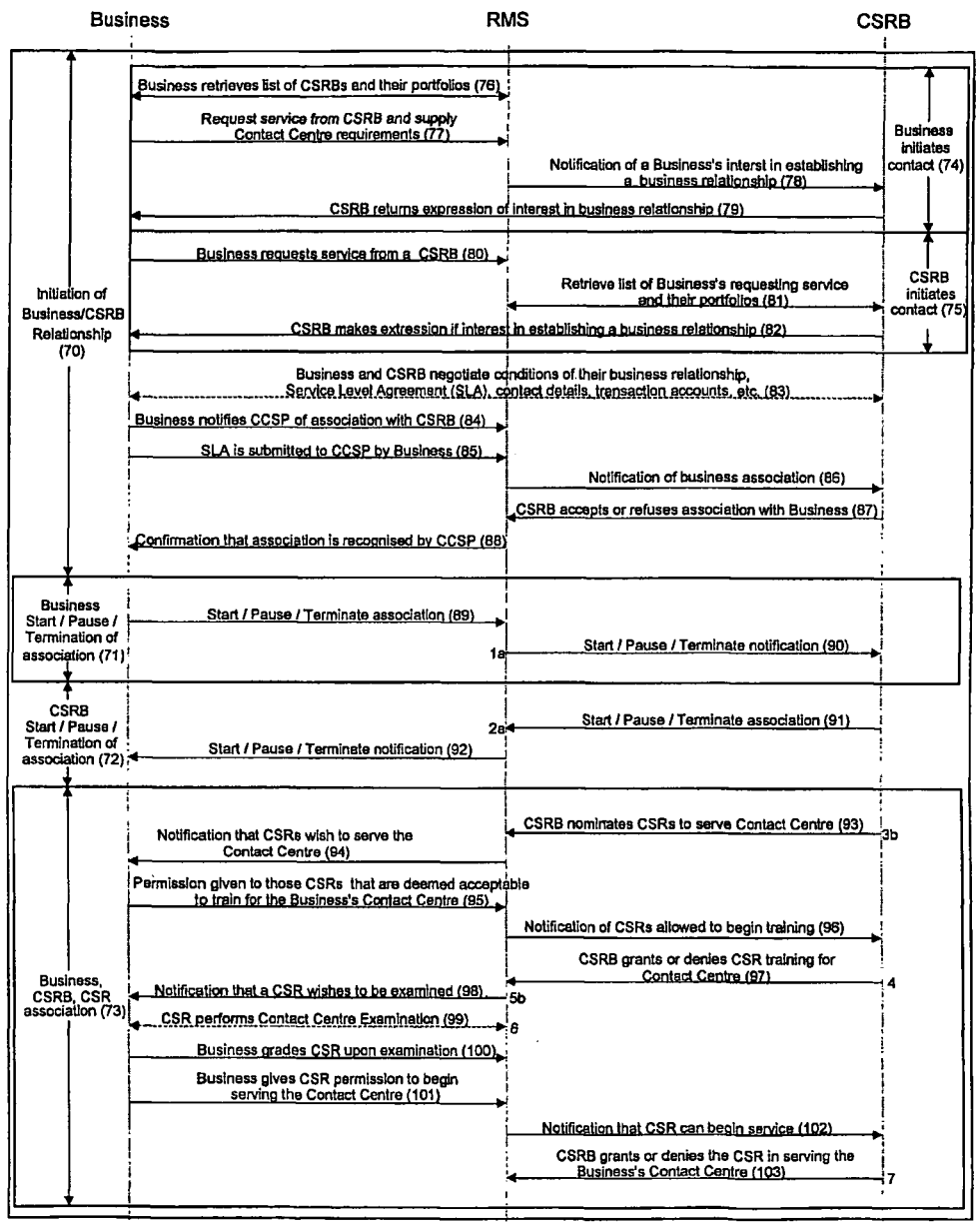
Figure 7:
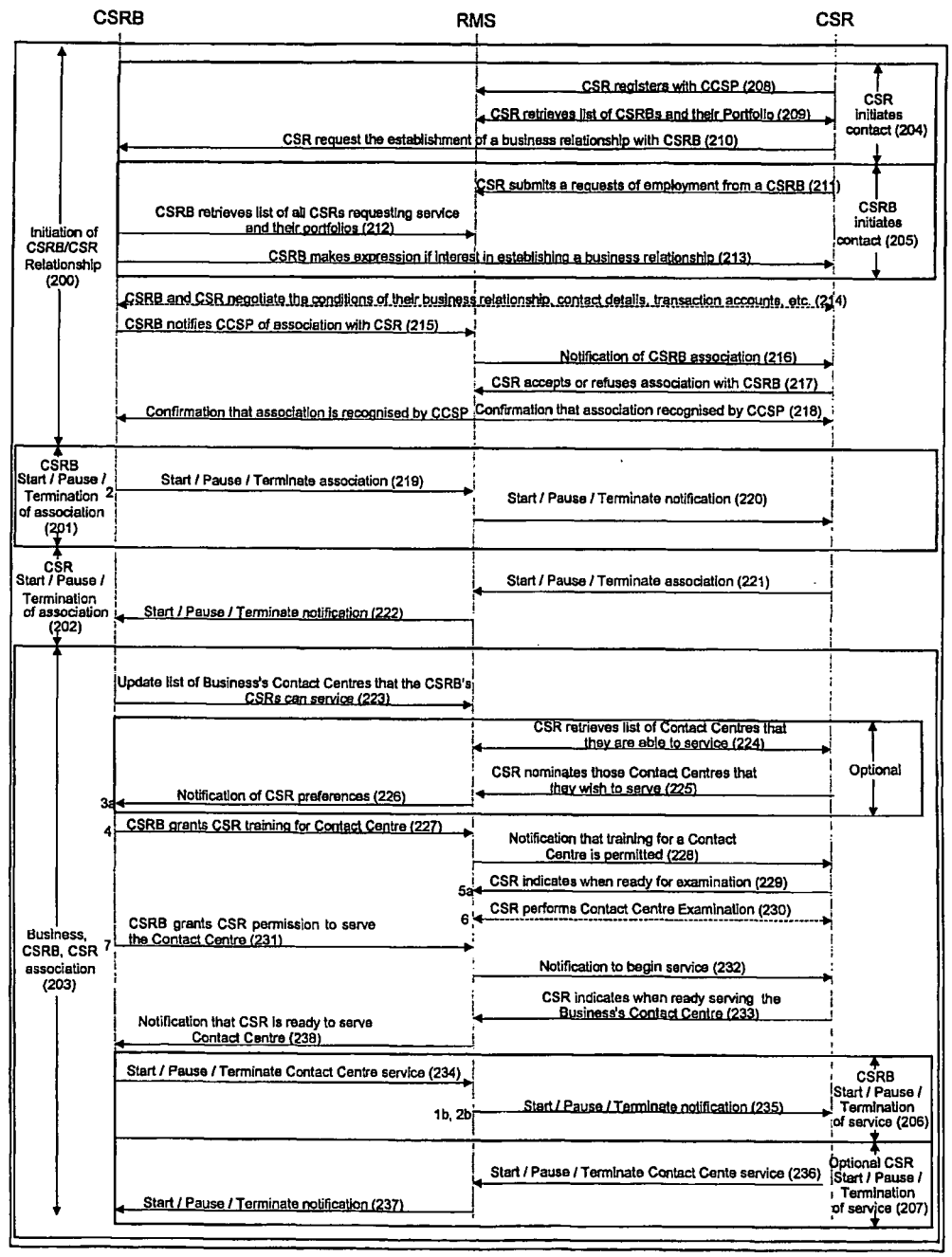

FIG. 6 is a diagram showing the steps executed by a relationship management system (RMS) of the CCMS when managing the relationship between a business and a customer service representative broker (CSRB); and FIG. 7 is a diagram showing the steps executed by the relationship management system (RMS) when managing the relationship between a customer service representative broker (CSRB) and a prospective customer service representative (CSR).

Figure 1:
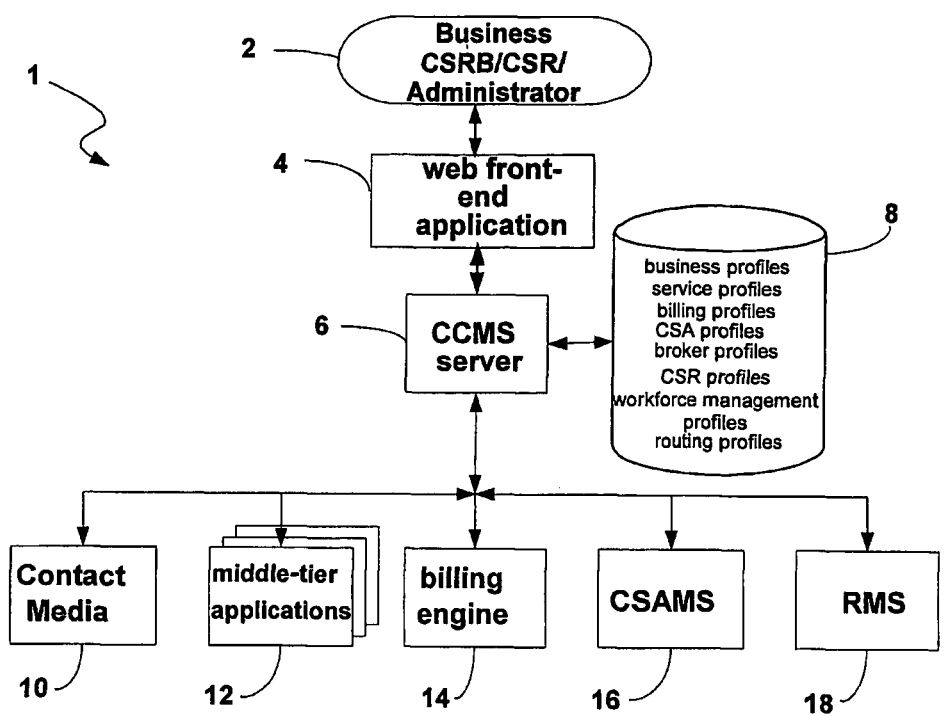
FIG. 1 is a block diagram of a preferred embodiment of a contact centre management system (CCMS)

A contact centre management system (CCMS) 1, as shown in FIG. 1, automates the processes of creating, activating, re-dimensioning and deactivating contact centres. In particular, it enables businesses to create one or more contact centres on demand. The contact centre management system 1 has a web-based application 4 that provides a network-accessible interface between a party 2 and a contact centre management (CCMS) server 6 of the system 1. The party 2 may be a business, a customer service representative broker (CSRB), customer service representative (CSR), or a contact centre (CC) administrator who accesses the CCMS 1 using a computer system or device. Access may be local, or remote over a communications network, such as the Internet. The server 6 stores and retrieves contact centre management data contained in a database 8. The database 8 includes profiles for businesses, services, billing, customer service applications, customer service representative brokers, customer service representatives, workforce management and call routing, etc. The server 6 also interfaces with contact media 10, a billing engine 14, a customer service application management system (CSAMS) 16, a relationship management server (RMS) 18 and a number of middle-tier application products 12. The middle-tier application products 12 are used by the contact centre management system 1 for managing contacts, including contact queuing, routing, monitoring and history tracking. In the described embodiment, the components or modules 4 to 18 of the CCMS 1 are implemented as software modules executed on standard computer systems such as Intel®-based computer systems running a Windows® operating system. However, it will be apparent that at least some or parts of the modules can be implemented by dedicated hardware circuits such as application-specific integrated circuits (ASICs).

A contact centre administrator within a business is able to use a web browser to create a new account and to request the creation of a new contact centre configuration by completing and submitting application forms provided by the web interface 4 of the contact centre management system 1. In order to create a new contact centre, customer service representatives (CSRs) are hired and trained. Alternatively, the business may already have some trained CSRs within the business. A customer service representative broker (CSRB) is a company that provides CSRs for contact centres. The process of staffing a contact centre with CSRs involves a number of key relationships, particularly those between the business wanting the new contact centre and one or more CSRBs and/or CSRs, and those between CSRBs and CSRs. These relationships are managed by the relationship management server (RMS) 18. The RMS 18 provides a central point of access for the business to review the portfolios of various CSRBs and/or CSRs and to request their services if desired. Alternatively, CSRBs can bid against other CSRBs on a contact centre service trading platform to provide their services to the business. The contact centre service trading platform is a generic trading product which is integrated within the CCMS (whether it is activated will depend on the business that operates the contact centre management system 1 (the contact centre service provider)), but can alternatively be provided by an external organisation.

The relationships between CSRs and CSRBs are managed by the RMS 18 in a similar fashion to the business/CSRB relationship. The subsequent steps of negotiating service agreements between the parties involved, and the coordination of these activities with the contact centre service provider (CCSP) are all managed by the RMS 18. The processes executed by the RMS 18 are described in more detail below.

The business contact centre administrator initiates configuration of the various components of the contact centre by completing and submitting the web-based forms. The information provided includes the location of the business knowledge base (i.e., information about the products and/or services of the business, preferably in electronic form, in which case the location can be a universal resource indicator, network address, pathname, etc.) and training materials, any required customer service applications (CSAs), the required contact queues and routing strategy, what media are to be enabled to handle contacts (e.g., PSTN, VoIP, email, chat, video, IVR, &c.), the scheduling of CSRs, and the messages to be used in response to callers. This information is stored in the database 8, and is used to configure the underlying contact centre servers (e.g., PSTN, VoIP call handling servers, chat, co-browse, IVR, speech recognition, desktop interaction servers), and the web application 4 using application programming interface (API) calls and/or direct database modification. After configuration of these or other necessary components, the contact centre administrator nominates the time at which the contact centre is to become active and its operating hours.

At any time, the business contact centre administrator can use the interface 4 to review the status of the contact centre either before activation, during operation or after termination. During operation, the contact centre administrator can review statistics on the performance of the contact centre, and can reconfigure, redimension, pause or terminate the contact centre. The contact centre management system 1 provides administrators with a simple tool for identifying contact centre requirements (e.g., number of CSRs, operating hours, routing, media, CSR schedules, etc.), and facilitating the management of CSRBs and CSRs through relationship and workforce management. Administrators can use the interface 4 to activate the requirements, once they have been identified, and to continually manage the states of business relationships and the scheduling of CSRs. The activation and management is performed by the CCMS server 6, which configures the contact centre components and the middle-tier products 12 using API calls and/or direct database manipulation.

Customer service representatives (CSRs) working for contact centres need to access customer, product and service information that is accessed through customer service applications (CSAs) belonging to the business requiring the contact centre. The customer service application management system (CSAMS) 16 integrates existing business applications with the contact centre management system 1, and allows CSRs to access customer service applications locally and/or remotely.

Figure 2:
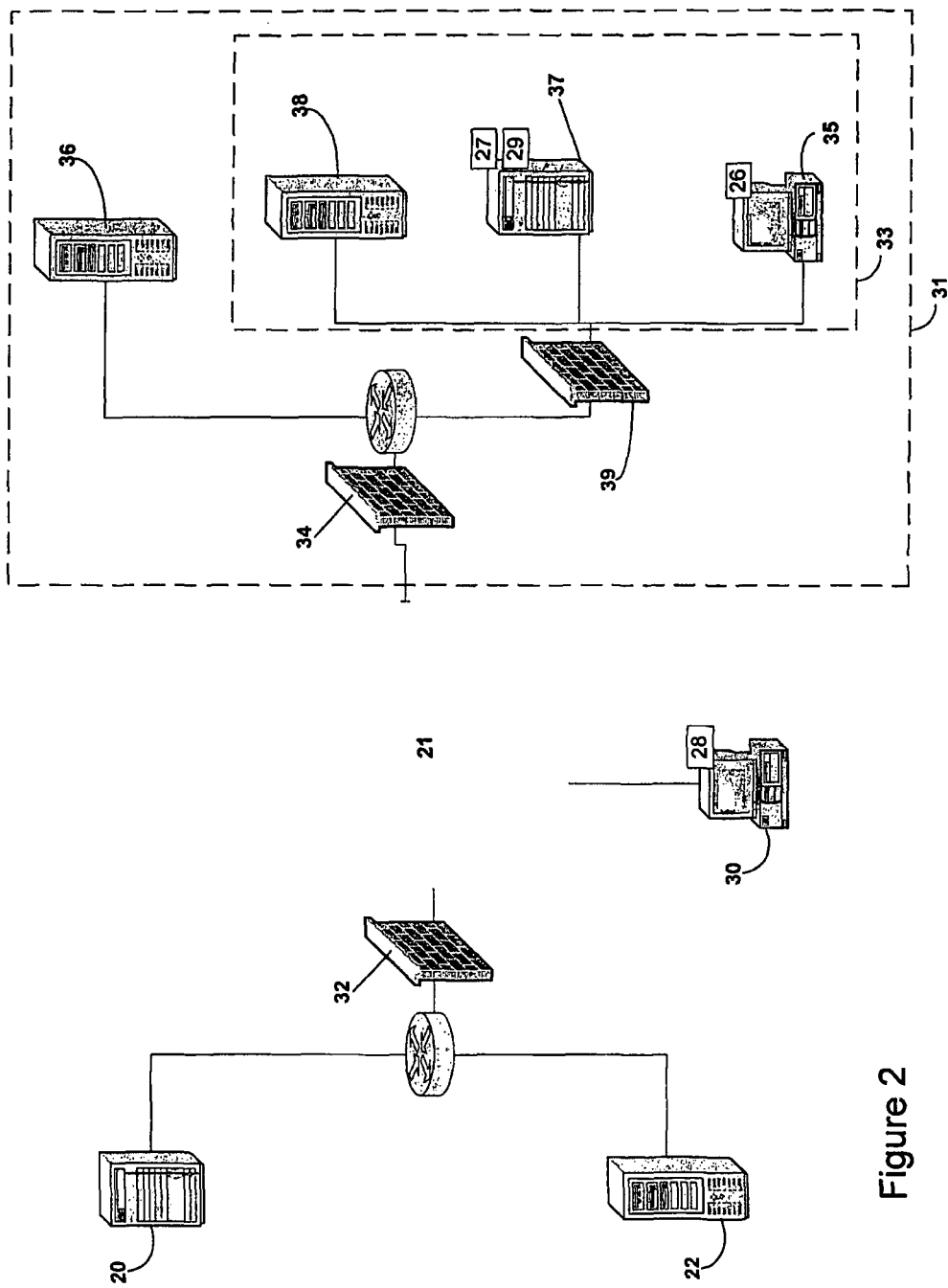
FIG. 2 is a block diagram of a customer service application management system (CSAMS) of the CCMS.

As shown in FIG. 2, the CSAMS 16 includes CSAMS server(s) 22, CSA proxy server(s) 20, a CSA learning robot 26, 27 and a CSA execution robot 28, 29. The CSA learning robot 26, 27 comprises a CSA learning robot front-end or graphical user interface (GUI) component 26, and a CSA learning robot back-end component 27. Similarly, the CSA execution robot 28, 29 comprises a CSA execution robot front-end or GUI component 28, and a CSA execution robot back-end component 29. The CSAMS 16 automates many of the tasks involved in accessing, navigating and exchanging data with a customer service application (CSA). Typically, a business protects its networks 31 by placing a main firewall 34 between the networks 31 and the Internet 21. This firewall 34 allows outside access to a public web server 36 that provides information to the general public. An intranet firewall 39 prevents public access to the business intranet 33 for security purposes. The intranet 33 provides access for CSRs located within the business to CSA host computers 37 and 38. One host computer 37 may include Windows®, Unix like or mainframe based CSAs, and may be served directly or via a Windows® terminal server, whereas the other host computer 38 may be a web server having web-based CSAs.

Figure 3:
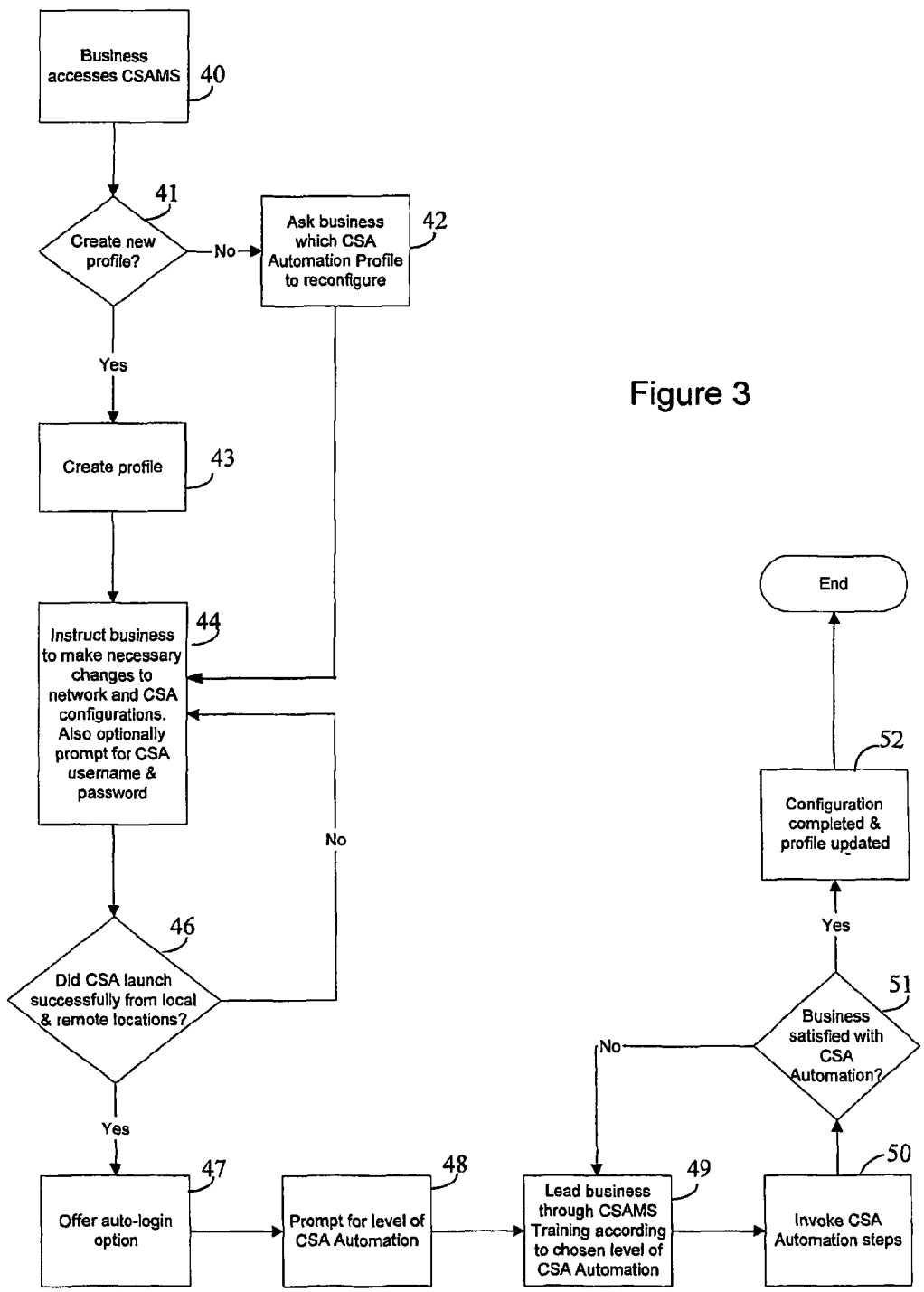
FIG. 3 is a flow diagram showing the steps of a configuration process executed during a configuration phase of the customer service application management system (CSAMS)

The CSAMS 16 executes a configuration process, as shown in FIG. 3. The CSAMS server 22 stores one or more profiles for each CSA which contain all of the access and automation information on that CSA. When a business administrator accesses the CSAMS server 22 (at step 40), the server 22 asks (at step 41) whether the administrator wishes to create a new CSA profile. If the answer is no, the administrator is asked (at step 42) to choose an existing CSA profile to reconfigure. If a new profile is required, the CSAMS server 22 creates a new CSA profile (at step 43). At step 44, the CSAMS server 22 prompts for the CSA type and instructs the administrator to change (if required) the configurations of the main firewall 34 and the intranet firewall 39 of the business network 31 to ensure that the CSA host computers 37, 38 are accessible via the Internet 21. The CSAMS server 22 also prompts for the locations of the CSA host computers 37, 38 (e.g., URLs, network addresses, etc.) and instructs the business to make any necessary changes to the CSA and support infrastructure to allow the CSA to be accessed via the Internet 21, and if desired, in a secure manner. During this step, the CSAMS server 22 also prompts the business to supply information on how CSRs can access the CSA, including whether the CSA requires user authentication. At step 46, the CSAMS server 22 asks the administrator whether the CSA can be successfully launched locally and/or remotely (as required), using a web-based desktop application configured on the basis of the supplied information. In response, the administrator attempts to launch the application as instructed. At step 46, the administrator selects a button to indicate the test result. If the test failed, the CSAMS server 22 leads the business through the configuration of step 44 again until either the access test succeeds or the business pauses the configuration procedure (giving the business the chance to rectify the problems and resume the configuration at a later time).

Once the administrator is able to access the CSA (securely if required by the business) based on the information collected by the CMAMS server 22, at step 47 the CSAMS optionally offers to maintain the username/password pairs on the CSAMS server 22 so that it can auto-login CSRs. If this option is not available, or offered but declined, the CSRs will have to login to the CSA manually. At step 48, the CSAMS prompts the business to choose a level of CSA automation: basic, which merely launches the CSA, or advanced, which retrieves the customer record and is able to perform complex CSA interaction on behalf of the CSR.

In order for the CSAMS 16 to automate the interactions with a CSA, it must learn how to interact with the CSA by monitoring, at step 49, the interaction between a human and the CSA during a training process, described in detail below. Later, the CSAMS 16 can replicate those interactions in order to reach a certain screen of the CSR, starting from a known base screen, enter and/or retrieve some data from an editable field, and return to the base screen (if required), for example. After the training process, the business administrator's demonstrated interactions with the CSA are replayed by executing at step 50 one or more compiled automation scripts with the CSA. If the administrator is not satisfied with the automation (step 51), the script(s) may be modified manually, or the training repeated (returning to step 49). Otherwise, the configuration is completed and the profile is updated (step 52). The CSA profile is then ready for use.

To train the CSAMS 16 how to interact with a particular CSA (step 49), the business administrator loads a page via the web interface 4 that downloads the CSAMS learning robot front-end 26 from the CSAMS server 22 to the administrator's computer 35. The CSAMS learning robot front-end 26 is a software module that executes on the administrator's computer 35 and communicates with and provides a graphical user interface to the CSAMS learning robot back-end 27. The CSAMS learning robot back-end 27 is a software module, that runs in the background and monitors the administrator's interactions with the CSA. The location of the CSAMS learning robot back-end 27 depends upon the type of CSA being trained. For example, if the CSA is a Windows® application executing locally on the administrator's computer 35, then the CSAMS learning robot back-end 27 executes also locally on the administrator's computer 35. This also applies if the CSA is a web-based application executing on the web server 38, being accessed by a web browser application executing on the administrator's computer 35. However, CSAs are often Windows® applications executing remotely on the application server 37, in which case the CSAMS learning robot back-end 27 also executes remotely on the application server 37, and this is the situation shown in FIG. 2. This also applies to the location of the CSAMS execution robot back-end 29.

Figure 4:
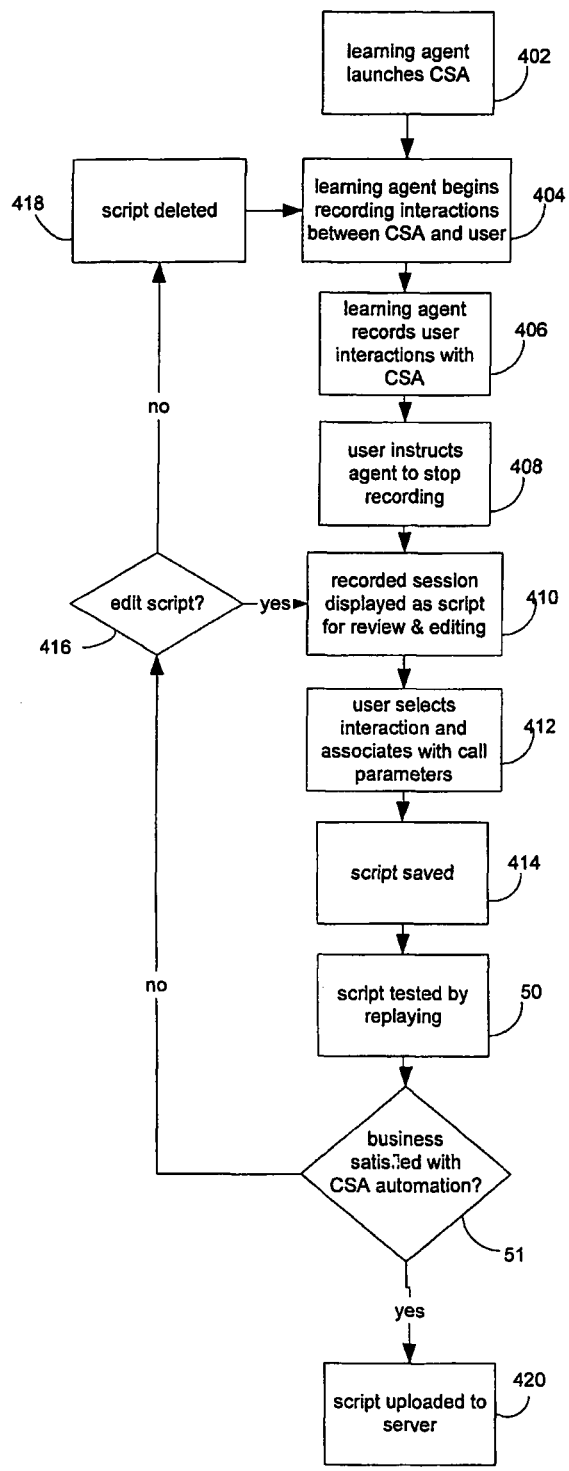
FIG. 4 is a flow diagram of a process used to generate an automation script for controlling a customer service application (CSA)

The training process, as shown in FIG. 4, begins when, upon loading, the CSAMS learning robot 26, 27 launches the CSA automatically (step 402). Using a menu of the CSAMS learning robot front-end 26, the administrator instructs (step 404) the CSAMS learning robot back-end 27 to begin recording the interactions with the CSA. The CSAMS learning robot back-end 27 includes sub-modules for each type of CSA (e.g., local and remote Windows®-based CSAs, and web-based CSAs). For Windows®-based CSAs (including terminal emulation CSAs), the CSAMS learning robot back-end 27 starts monitoring operating system events (e.g., Windows® events) in order to record the data being sent from the keyboard and/or other user input devices to the CSA.

Prior to training, the administrator enters a list of call parameters that would normally be collected from the caller (e.g., through an IVR and/or web forms). During training, these parameters are associated with CSA usage (e.g., entered data, menu options, etc.). At step 406, the CSAMS learning robot back-end 27 monitors and records keystrokes (e.g., TAB, ALT-F, ENTER, etc.) and optionally, events generated by other user input devices such as a mouse.

The administrator navigates to the appropriate screen and fields in order to enter some data, for example, a customer identification number, customer name, telephone number or product type etc. After reaching the desired screen of the CSA, the administrator instructs the learning robot back-end 27 to stop recording by selecting from a menu (step 408). The recorded session is then displayed as a script of the interactive session to allow the administrator to review and edit the script (step 410). At step 412, the administrator selects another menu of the CSAMS learning robot front-end 26 and identifies the call parameters to be associated with each field. Each CSA application menu and/or menu option can also be associated with one or more call parameters. For example, the administrator can associate data entered into a particular field by selecting the data from the displayed session script, and then selecting one of the available call parameters from a list box displayed by the learning robot front-end 26. This replaces the data in the script with a tagged reference to the selected call parameter. The scripts therefore include parameter tags which are replaced during call handling by the data accompanying the call (call parameters). The parameter tags are used later by the CSAMS execution robot 28, 29 to enter data or select a CSA menu option based on the actual data obtained during the call. The script is saved at step 414 when the administrator, through a menu, instructs the CSAMS learning robot 26, 27 to do so. As an alternative to making field-parameter associations after learning, the administrator can make associations during CSA interactions. In this case, the script is not presented to the administrator until the recording is stopped.

Optionally, the user can enter conditional statements to define script flows or execution steps based on the actual data obtained during the call. This allows for different CSA usage based on different data received.

Upon completion of learning, the administrator can instruct (step 50) the CSAMS learning robot 26, 27 to replay the recorded interactions for verification. If one or more associations were made, the learning robot 26, 27 prompts the administrator for call parameter value(s) so that they can be inserted into their associated field(s), menu(s) and/or menu options(s) during the verification process. If the administrator is not satisfied with the replayed automation, the script may be modified manually (step 416), or the script deleted (step 418) and the training repeated (step 404). Otherwise, the administrator instructs the CSAMS learning robot 26, 27 to complete training via a menu, and the learning robot 26, 27 automatically uploads the final script to the CSAMS server 22 at step 420.

Web-based CSAs are handled in a similar fashion. During training, the CSAMS learning robot back-end 27 executing on the business computer 35 monitors user interactions and web-browser events locally. An alternative method for web-based CSA training is also provided, whereby the administrator is asked to set focus on a web page field and then select the associated call parameter(s) from a call parameter window of the CSAMS learning robot front-end 26. This process can be repeated as necessary to create the required call parameter associations.

The administrator can optionally create return-scripts by training the CSAMS learning robot 26 to return the CSA to its initial state, or to return to a certain screen from another one. For example, before executing an automation script, the robot determines the application's current active screen (in focus) and executes a return-script in order to return the application to the base screen prior to executing the automation script. The return-script training process is similar to that described above.

When the training is complete, the CSAMS learning robot back-end 27 compiles CSA automation scripts and, if required, return-scripts for that CSA, and subunits them to the CSAMS server 22.

Figure 5:
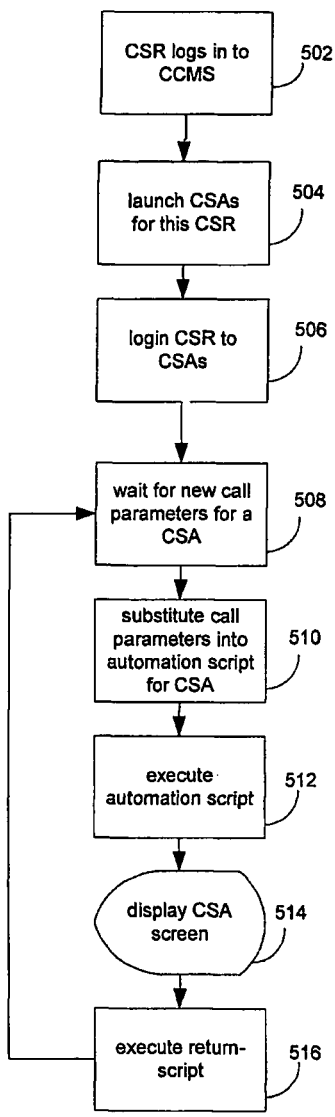
FIG. 5 is a flow diagram of a process used to control a customer service application on the basis of the automation script.

The CSAMS execution robot front-end 28 executes on a computer 30 used by a CSR to handle contacts. As described above, the CSAMS execution robot back-end 29 executes remotely on the application server 37, as shown in FIG. 2, for Windows®-based CSA applications also executing on the application server 37. For web-based or locally executing applications, the CSAMS execution robot back-end 29 executes locally on the CSR's computer 30. Similar to the CSAMS learning robot back-end 27, the CSAMS execution robot back-end 29 includes sub-modules for each type of CSA (e.g., local and remote Windows®-based CSAs, web-based CSAs etc.) The process used to control CSAs is shown in FIG. 5. When a CSR logs into the contact centre management system 1 (step 502), the CSAMS 16 optionally enables network access and launches all of the CSAs for each business that the CSR works for (step 504). For a local Windows®-based CSA, the CSAMS execution robot 28, 29 launches it locally on the CSR's computer 30. For a remote Windows®-based CSA, the CSAMS execution robot 28, 29 opens a network connection between the Windows® application server 37 and the CSR's computer 30 and launches the appropriate CSA. For a web-based CSA, the CSAMS execution robot 28, 29 loads the CSA either directly from a business web server 38 or via the CSA proxy server 20.

When the CSR handles a contact which requires access to a CSA, the system behaviour depends upon the level of automation selected during the configuration process. Regardless of the automation level, the CSAMS execution robot 28, 29 first launches the CSA and performs auto-login if required (step 506), and makes visible the local CSA, the web page or terminal client window on the CSR's computer 30 to provide access for the CSR to the CSA. If the automation level for the CSA was selected as basic, then the CSR interacts with the CSA in the usual manner by entering data and navigating through the CSA manually. Alternatively, if the automation level was selected as advanced the appropriate automation steps are executed. For example, known data fields can be filled in and/or menu options selected automatically using the call parameters so that the appropriate information and/or screen is displayed to the CSR as the call is being handled. The CSAMS execution robot 28, 29 makes such automation possible by replacing (step 510) the tagged call parameter names in the automation scripts created by the CSAMS learning robot 26, 27 during the training process with their corresponding values for the current call, and replaying (step 512) the resulting scripts.

For example, a CSA script that enables viewing of a customer insurance policy based on the customer's policy number may include a tag called <policy_number> that is replaced by the actual policy number collected by an IVR system or a web form etc. Similarly, CSA menu options are described in the scripts by menu/option tags, which are replaced during call handling by the data accompanying the call. For example, menu or dialog items can be handled by using keyboard shortcuts, in which case the selection of an item is represented simply as a series of keystrokes, such as ALT-F+S effecting selection of the Save option in the File menu of a typical Windows® application. Alternatively, if a shortcut is not defined for an option, the ALT, arrow, TAB and/or ENTER keys can be used. Otherwise, menu selection events can be sent to the application by the CSAMS execution robot back-end 29. Optionally, when the CSR accepts a call related to another business, the previous business'CSA screen is disabled prior to enabling the next business'CSA screen.

After replacing the tagged parameters with the corresponding call parameter values, the resulting script is replayed and the CSA displays the desired screen and data (step 514). When the CSR is ready to accept another call, the CSAMS execution robot 28, 29 optionally executes return-script(s) to bring the CSA back to a particular state and/or screen (step 516).

During the execution of scripts for time-critical CSAs, the CSAMS execution robot 28, 29 optionally checks the state of the CSA before replaying each recorded event in order to ensure events are replayed at the appropriate destination.

It will be apparent that the locations of various components described are not limited to those described above. For example, CSA hosts 37, 38 for remote access may reside outside of the business' network 31, such as on a third-party application hosting service provider's network, or even on the CCSP's network. Similarly, the business computer 35, which the business administrator uses for CSAMS configuration, can reside within or outside the business' network 31, or on the CCSP's network. This flexibility also applies to the CSR computer 30.

The CSAMS 16 therefore provides a tool for interfacing with existing and future CSA applications. It integrates any customer service application with the contact centre management system 1, providing screen pop-up functionality and auto data entry and retrieval without the need for software integration. It will be apparent that the CSAMS 16 can also be applied to applications that are not associated with a contact centre. For example, the learning and execution robots 26 to 29 can be utilised to extract data from one application and insert it into another, without requiring software integration. These applications can be of a wide variety of types and located anywhere that is accessible by a communications network. In this scenario, a first CSAMS execution robot back-end 29 uses one or more first automation scripts with tagged parameters for a first application to send data to that application, as described above. A second CSAMS execution robot back-end 29 uses one or more second automation scripts with tagged parameters for a second application to extract data from the output generated by that application. The second CSAMS execution robot back-end 29 automation scripts are triggered through one or more defined user-generated events within the automation scripts. For example, on clicking a specific button or a field losing focus within the second application, the second CSAMS execution robot back-end 29 executes a data gathering automation script, collecting data desired before transferring it on to the first CSAMS execution robot back-end 29. The first CSAMS execution robot back-end 29 executes an automation script using the data received from the second CSAMS execution robot back-end 29. The data is extracted by using the second automation script as a template for comparing with the output generated by the second application. A data field is identified by matching an alphanumeric string appearing at the location of the parameter in the automation script. For more complex data values, regular expressions can be included in the automation script, either within the tagged parameter fields or in the remainder of the script. Parameters extracted in this way can then be sent to the other CSAMS execution robot back-end 29, possibly executing on a remote computer system, which then inserts one or more of the extracted parameters into the automation script for the first application. Thus data generated by the second application is automatically extracted from its output, and provided to the first application, effectively integrating the two applications without requiring any modification of either application. In some situations, the second CSMAS execution robot back-end 29 and second application may not be required, with access to the first application occurs through programmed APIs. The APIs allow the specification of automation scripts and parameter data. It will also be apparent that data can be sent to and extracted from the same application.

The relationship management server (RMS) 18 is the component of the CCMS 1 that controls the relationship between a business requiring a contact centre and a customer service representative broker (CSRB), as shown in FIG. 6. The process as executed can be broken up into four major steps: (i) the initiation of the relationship 70, (ii) the commencement, pausing, or termination of the relationship by the business 71, or (iii) by the CSRB 72, and finally (iv) the operation of the relationship during the business/CSRB association 73. Each of these steps comprises a number of sub-steps. The process can be modified to suit each individual business/CSRB relationship. A business or CSRB can modify the process to suit their relationship requirements by altering the order of steps, remove steps or add steps. Hence, when controlling the relationship between a business and CSRB, the RMS 18 uses the corresponding modified execution process.

The relationship may be initiated by either the business or the CSRB. If the business initiates contact, then the process begins with the business initiating contact at step 74. First, a business retrieves from the RMS 18 a list of CSRBs wishing to serve a contact centre and their portfolios (step 76). From this list, the business posts a "request of interest" in a particular CSRB with the RMS 18, along with a description of the contact centre requirements (step 77). The RMS 18 forwards this request to the intended CSRB for consideration (step 78). If the CSRB wishes to establish a relationship with the business, then it notifies the business directly (step 79).

Alternatively, a relationship between a particular business and a particular CSRB can be initiated by the CSRB (step 75). In this scenario, the business posts a request for service from interested CSRBs to the RMS 18 (step 80). A CSRB interested in establishing new relationships can retrieve from the RMS 18 a list of any businesses requesting CSRB services and their portfolios (step 81). The CSRB can then approach the business with the intention to establish a business relationship (step 82).

Alternatively, to alleviate the need for either a business or a CSRB to initiate contact, both parties may approach a contact centre service trading platform. As a service offered by the CCSP or an external organisation, the trading platform allows CSRBs to bid against each other for the right to serve a business's contact centre. Bidding can involve the offering of price, quality, or any other feature that a CSRB can offer as part of their service to a business's contact centre. Alternatively, the initiation of a business relationship can also be achieved without the assistance of the RMS 18. Ultimately, the RMS 18 needs only to know if an association should exist between any registered CCSP parties (business, CSRB, CSR) for the contact centre management system 1 to perform correctly.

When a business and a CSRB wish to establish a business relationship, they externally negotiate all conditions of contract independently of the RMS 18 (step 83). Once settled, the RMS 18 is informed by the business of the new business relationship (step 84). The business also submits a service level agreement (SLA) to the RMS 18 (step 85), defining the conditions of the business/CSRB relationship. The SLA can act as a guide for the RMS 18 to notify either party of breaches in the conditions of contact. The SLA contains a number of parameters that relate to the operation of the contact centre (for example, end-user queuing time, end-user handling time, average agent grading, etc.). These parameters can be monitored by the contact centre management system 1, and a notification sent to the appropriate parties if any of these parameters are breached. The RMS 18 notifies the CSRB of the association (step 86), and the CSRB then accepts or declines the association (step 87). If accepted, then the RMS 18 forms an association between the two parties and notifies the business that the association is recognised by the CCSP (step 88). The RMS 18 does not need to know the details of a business relationship existing between any two parties, but only whether or not they should be interacting in accordance with their association.

The association between a business and a CSRB may be started, paused or terminated at any time (steps 71, 72). This may be initiated by the business notifing the RMS 18 of the change in status (step 89), in which case the RMS 18 notifies the CSRB (step 90). Conversely, the CSRB may notify the RMS 18 of the change in status (step 91), and the RMS 18 then notifies the business (step 92).

Having established their association, the business and the CSRB work together to staff the business contact centre (step 73). As the CSRB is the supplier of CSRs, the CSRB first nominates a list of CSRs to serve in the contact centre and sends this to the RMS 18 (step 93). The RMS 18 notifies the business of the proposed CSRs (step 94). The business reviews the list and informs the RMS 18 which CSRs it deems acceptable to train for the contact centre (step 95). The RMS 18 forwards this information to the CSRB (step 96) and the CSRB trains the approved CSRs. When the training is complete, the CSRB notifies the RMS 18 whether it confirms or denies that each CSR is appropriately trained (step 97). When confirmed, the RMS 18 notifies the business (step 98) that there are trained CSRs that wish to be certified, and the business subsequently performs the contact centre examination (step 99). The business grades the CSRs and informs the RMS 18 of the result (step 100). If the CSR performed adequately in the examination, the business notifies the RMS 18 that the CSR is approved to work in the contact centre (step 101). The RMS 18 subsequently informs the CSRB that the CSR is approved to begin work (step 102), and the CSRB grants or denies approval for the CSR to begin work (step 103).

During the staffing of the business contact centre, the CSRB nominates the working hours and percentage of time that each CSR can be allocated to the business. The business then uses a Workforce Management System to schedule the CSRs on contact centre activities within the boundaries provided by the CSRB.

The RMS 18 also controls the CSRB/CSR relationship, as shown in FIG. 7. This relationship may be divided into four major parts: (i) initiation 200, (ii) CSRB-initiated status changes 201, (iii) CSR-initiated status changes 202, and (iv) normal association 203. The initiation phase 200 can begin with CSR-initiated steps 204 or CSRB-initiated steps 205. A CSR can begin the relationship by registering with the CCSP on the RMS 18 (step 208). After registration, the CSR retrieves a list of CSRBs requesting CSRs and their portfolios from the RMS 18 (step 209). If the CSR wishes to register with a particular CSRB, the CSR makes direct contact with the CSRB, indicating the desire to establish a business relationship (step 210).

Alternatively, the process can begin when a CSR notifies the RMS 18 that he or she wishes to work for a CSRB (step 211). A CSRB requests from the RMS 18 a list of available CSRs and their portfolios (step 212). If the CSRB wishes to employ a particular CSR, the CSRB notifies them directly (step 213).

Having made contact, the CSRB and CSR negotiate the terms of their business relationship (step 214). The CSRB then informs the RMS 18 of the desire to form a new association with the CSR (step 215), and the RMS 18 notifies the CSR (step 216). The CSR then accepts or declines the association (step 217), and the RMS 18 sends confirmation messages to both parties (step 218).

Once initiated, the association between a CSRB and a CSR can be started, paused, or terminated when the CSRB sends a message to the RMS 18 (step 219) and the RMS 18 notifies the CSR (step 220). Alternatively, the relationship can be started, paused, or terminated when the CSR sends a message to the RMS 18 (step 221) and the RMS 18 notifies the CSRB (step 222).

During their association, the CSRB can post to the RMS 18 an updated list of business contact centres that the CSRs can service (step 223). CSRs can retrieve this list (step 224) and notify the RMS 18 of those contact centres that they wish to serve (step 225). The RMS 18 informs the CSRB of this choice (step 226).

When a CSR wishes to work for a particular contact centre, they must first be trained. Having received a list of the contact centres that a particular CSR wishes to work for, the CSRB grants permission to the CSR to begin training for each contact centre that it chooses, by sending a message to the RMS 18 (step 227), which then informs the CSR (step 228). The CSR learns the appropriate training materials and then responds to the RMS 18 when they are ready to be examined (step 229). The CSR performs the contact centre examination (step 230) and, if appropriate; the CSRB sends a message to the RMS 18 granting permission for the CSR to begin serving the contact centre (step 231). The RMS 18 notifies the CSR (step 232). When the CSR wishes to begin working for the contact centre, the CSR notifies the RMS 18 (step 233) which notifies the CSRB (step 238).

At any time, the CSRB can start, pause or terminate the contact centre service by sending a message to the RMS 18 (step 234), which notifies the CSR (step 235). Conversely, the CSR can notify the RMS 18 that they wish to start, pause or terminate their contact centre service (step 236), and the RMS 18 notifies the CSRB (step 237).

Many modifications will be apparent to those skilled in the art without departing from the scope of the present invention as herein described with reference to the accompanying drawings.

The invention claimed is:

1. An automation process executed by a computer system having data processing logic so as to at least partly automate execution of an interactive computer system application, including:
   recording at a first time, using the data processing logic, a sequence of interactions between an initial execution of the computer system application and a user of the computer system application, the recorded sequence of interactions including outputs of the computer system application displayed to the user of the computer system application during the initial execution and application user inputs, provided by the user of the computer system application in response to the displayed outputs to initiate application functions during the initial execution of the computer system application, the application user inputs including at least one of:
- one or more keystrokes selecting one or more options provided by the computer system application, the keystrokes being additional to entering alpha-numeric or symbolic data; and
- selections of options using an input device other than a keyboard,
- the application user inputs further representing first values for input parameters of the computer system application;

at a second time subsequent to the first time, displaying interaction data representing the recorded interactions, including (i) the recorded outputs of the computer system application displayed to the user of the computer system application during the initial execution of the computer system application, and (ii) the application user inputs provided by the user of the computer system application during the initial execution of the computer system application in response to the displayed outputs, the application user inputs being displayed at the second time interspersed within the recorded output of the computer system application at locations within the recorded interactions corresponding to the temporal sequence of the application user inputs relative to the corresponding computer system application outputs;

receiving parameter field data representing the locations of the application user inputs within the recorded interactions, the parameter field data being generated from user selections of those locations within the displayed interaction data;

accessing parameter label data representing respective labels for the input parameters of the computer system application;

generating association data representing respective user selected associations between the labels for the input parameters and the respective locations within the recorded interactions to provide second values for the input parameters;

storing the association data and at least the recorded application outputs on at least one computer-readable storage medium; and automatically generating an ordered sequence of inputs at a third time subsequent to the second time based on the association data and at least the recorded application outputs to provide the ordered sequence of inputs to the interactive computer system application without user interaction.

2. An automation process as claimed in claim 1, wherein each of the locations within the recorded interactions is selected by the user of the computer system application during said recording and when the computer system application is ready to receive a value for the corresponding input parameter.

3. An automation process as claimed in claim 1, wherein each of the locations within the recorded interactions is selected by way of the user of the computer system application selecting a portion of the recorded application user inputs representing a user-provided value for the corresponding input parameter from a visual display of the recorded application user inputs to the computer system application.

4. An automation process as claimed in claim 1, wherein the labels include symbolic names for the input parameters.

5. An automation process as claimed in claim 4, wherein said association data represents a location for each input parameter by a corresponding symbolic name for that input parameter, each symbolic name being included at a corresponding location within said recorded application user inputs.

6. An automation process as claimed in claim 5, wherein generating said association data includes replacing one or more portions of said computer system application user inputs representing respective values of respective input parameters with respective symbolic names for said input parameters.

7. An automation process as claimed in claim 5, wherein each of said one or more symbolic names is tagged.

8. An automation process as claimed in claim 1, including:
- accessing the second values representing one or more labels and respective first values for respective ones of said input parameters;
- automatically generating the sequence of inputs for the computer system application by merging the recorded application outputs and the second values for said input parameters, wherein each second value for an input parameter is included at a corresponding location within the sequence of inputs in accordance with the label for that value and the association data; and
- automatically sending the generated sequence of inputs to said computer system application to at least partly automate said computer system application.

9. An automation process as claimed in claim 1, wherein said sequence of inputs includes recording application user input events generated in response to application user activity.

10. An automation process as claimed in claim 9, including transmitting to said computer system a learning component adapted to monitor said events.

11. An automation process as claimed in claim 1, including receiving at a server interface access data for establishing a communications session with said computer system over a communications network.

12. An automation process as claimed in claim 1, including processing the recorded application outputs to generate return data for sending to said computer system application to return said computer system application to a predetermined state.

13. An automation process as claimed in claim 1, including:
- receiving output data representing output generated by said computer system application, said output data including output parameter value data representing one or more first values for respective output parameters of said computer system application;
- accessing output association data representing associations between said one or more output parameters and respective locations of said output parameters within said recorded interactions; and
- processing said output data and said output association data to determine said one or more second values of said one or more output parameters.

14. An automation process as claimed in claim 8 including:
- receiving recorded interactions representing output generated by a second computer system application, said output data including output parameter value data representing one or more first values for respective output parameters of said second computer system application;

accessing output association data representing associations between said one or more output parameters and respective locations of said one or more output parameters within said recorded interactions; and processing said recorded interactions and said output association data to determine said one or more second values for said one or more output parameters;

wherein the determined one or more second values for said one or more output parameters of said second computer system application are used as said one or more values for said input parameters of said computer system application.

15. An automation process as claimed in claim 8, including:

receiving output data representing output generated by said computer system application, said output data including output parameter value data representing one or more first values for respective output parameters of said computer system application;

accessing output association data representing associations between said one or more output parameters and respective locations within said recorded interactions of said output parameters; and processing said output data and said output association data to determine said one or more values for said one or more output parameters.

16. An automation process as claimed in claim 1, including:

receiving output parameter label data representing one or more labels for respective output parameters of said computer system application;

receiving output data representing output generated by said computer system application for display to the user of said computer system application, said output data including output parameter value data representing one or more values for said one or more output parameters;

receiving output parameter field data identifying one or more locations of the of respective application outputs within the recorded interactions, the output parameter field data being generated from user selections of the displayed interaction data; and generating output association data representing one or more associations between said locations within said recorded interactions and said labels for said output parameters for use in determining corresponding second values for said output parameters from subsequent output of said computer system application.

17. An automation process as claimed in claim 16, including:

receiving output data representing output generated by said computer system application, said output data including output parameter value data representing one or more values for respective output parameters of said computer system application; and processing said output data and said output association data to determine said one or more second values for said one or more output parameters.

18. An automation process as claimed in claim 1, including establishing a network connection to access said computer system application.

19. An automation process as claimed in claim 1, including displaying instructions to assist in configuring said computer system application.

20. An automation process as claimed in claim 19, wherein said instructions include instructions to assist in configuring network access to said computer system application.

21. An automation process as claimed in claim 1, wherein said recording includes recording user interface events generated in response to application user activity.

22. An automation process as claimed in claim 21, wherein said events include operating system events associated with at least one input device of said application user.

23. An automation process as claimed in claim 22, wherein said at least one input device includes a keyboard.

24. An automation process as claimed in claim 23, wherein said at least one input device includes a cursor pointing device.

25. An automation process as claimed in claim 1, including configuring network access to said computer system.

26. An automation process as claimed in claim 1, wherein said one or more input parameters include one or more parameters for a call received at a contact center.

27. An automation process as claimed in claim 1, wherein said computer system application is a database application for use in a call center.

28. An automation process executed by a computer system having data processing logic so as to at least partly automate a computer system application, including:

accessing parameter field data generated from a user selecting locations of application user inputs within recorded interactions, the recorded interactions including a sequence of interactions between an initial execution of the computer system application and a user of the computer system application, the recorded sequence of interactions including outputs of the computer system application displayed to a user of the computer system application during the initial execution and application user inputs, provided by the user of the computer system application in response to the displayed outputs to initiate application functions during the initial execution of the computer system application, the application user inputs including at least one of:

one or more keystrokes selecting one or more options provided by the computer system application, the keystrokes being additional to entering alpha-numeric or symbolic data; and selections of options using an input device other than a keyboard, the application user inputs further representing first values for input parameters of the computer system application;

accessing second values for the input parameters generated from association data representing respective user selected associations between labels for the input parameters and the respective locations within recorded interactions, the recorded interactions including (i) the recorded outputs of the computer system application displayed to the user of the computer system application during the initial execution of the computer system application, and (ii) the application user inputs provided by the user of the computer system application during the initial execution of the computer system application in response to the displayed outputs, the application user inputs being interspersed within the recorded output of the computer system application at locations within the recorded interactions corresponding to the temporal sequence of the application user inputs relative to the corresponding computer system application outputs;

automatically generating, using data processing logic of the computer system, a sequence of inputs for said computer system application by merging the recorded application outputs and the second values for said input parameters, wherein each second value for an input parameter is included at a corresponding location within the sequence of inputs in accordance with the label for that value and the association data; and automatically sending, using data processing logic of the computer system, said generated sequence of inputs to said computer system application, at least partly automating said computer system application.

29. An automation process as claimed in claim 28, including:

receiving output parameter label data representing one or more labels for respective output parameters of said computer system application;

receiving output data representing output generated by said computer system application for display to said user of said computer system application, said output data including output parameter value data representing one or more values for said one or more output parameters;

receiving output parameter field data identifying one or more locations of respective ones of said one or more output parameters within said recorded interactions; and generating output association data representing one or more associations between said locations within said recorded interactions and said labels for said output parameters for use in determining corresponding second values for said output parameters from subsequent output of said computer system application.

30. An automation process as claimed in claim 28, including using at least one of said one or more values for said input parameters to evaluate one or more conditional statements defining control flow for the automation process.

31. An automation process as claimed in claim 28, including:

receiving output data representing output generated by said computer system application, said output data including output parameter value data representing one or more values for respective output parameters of said computer system application;

accessing output association data representing associations between said one or more output parameters and respective locations of values of said output parameters within said recorded interactions; and processing said output data and said output association data to determine said one or more values for said one or more output parameters.

32. An automation process as claimed in claim 28, including:

receiving recorded interactions representing output generated by a second computer system application, said output data including output parameter value data representing one or more first values for respective output parameters of said second computer system application;

accessing output association data representing associations between said one or more output parameters and respective locations of said one or more output parameters within said recorded interactions; and processing said recorded interactions and said output association data to determine said one or more second values for said one or more output parameters;

wherein the determined one or more second values for said one or more output parameters of said second computer application are used as said one or more values for said input parameters for said computer system application.

33. An automation process executed by a computer system, including:

receiving output data representing output generated by a computer system application, said output data including parameter value data representing one or more values for respective output parameters of said computer system application created by a sequence of interactions between an initial execution of the computer system application and a user of the computer system application, the sequence of interactions including outputs of the computer system application displayed to the user of the computer system application during the initial execution and application user inputs, provided by the user of the computer system application in response to the displayed outputs to initiate application functions during the initial execution of the computer system application, the application user inputs including at least one of:

one or more keystrokes selecting one or more options provided by the computer system application, the keystrokes being additional to entering alpha-numeric or symbolic data; and selections of options using an input device other than a keyboard;

receiving output parameter label data representing respective labels for the output parameters for said computer system application;

receiving output parameter field data representing locations of the outputs of the computer system application within the sequence of interactions including (i) the outputs of the computer system application displayed to the user of the computer system application during the initial execution of the computer system application, and (ii) the application user inputs provided by the user of the computer system application during the initial execution of the computer system application in response to the displayed outputs, the application user inputs being interspersed within the outputs of the computer system application at locations within the output data corresponding to the temporal sequence of the application user inputs relative to the corresponding computer system application outputs, the output parameter field data being generated from user selections of those locations within the displayed interaction data;

generating, using data processing logic of the computer system, association data representing respective user selected associations between said locations within said output data and said labels for respective output parameters; and determining, using data processing logic of the computer system, second values for respective output parameters based on said output data and said association data.

34. A process as claimed in claim 33, wherein using data processing logic of the computer system to process said output data and said association data includes matching portions of said output data with corresponding portions of stored second output of said computer system application to identify said values.

35. A process as claimed in claim 34, wherein said matching includes regular expression matching.

36. A process as claimed in claim 33, including sending at least one of said one or more values to a second computer system application to at least partly automate said second computer system application.

37. A process as claimed in claim 36, wherein said sending is based on second association data representing one or more associations between one or more input parameters for said second computer system application and respective locations within a second sequence of interactions representing use of said second computer system application by a user of the second computer system application.

38. An automation process executed by a computer system, including:
  receiving output parameter label data representing one or more labels for respective output parameters of a computer system application;
  receiving output data representing output generated by said computer system application for display to a user of said computer system application, said output data including output parameter value data representing one or more values for said one or more output parameters created by a sequence of interactions between an initial execution of the computer system application and the user of the computer system application, the recorded sequence of interactions including outputs of the computer system application displayed to the user of the computer system application during the initial execution and application user inputs, provided by the user of the computer system application in response to the displayed outputs to initiate application functions during the initial execution of the computer system application, the application user inputs including at least one of:
    one or more keystrokes selecting one or more options provided by the computer system application, the keystrokes being additional to entering alpha-numeric or symbolic data; and
    selections of options using an input device other than a keyboard;
  receiving output parameter field data representing locations of the outputs of the computer system application within recorded interactions including (i) the recorded outputs of the computer system application displayed to the user of the computer system application during the initial execution of the computer system application, and (ii) the application user inputs provided by the user of the computer system application during the initial execution of the computer system application in response to the displayed outputs, the application user inputs being interspersed within the outputs of the computer system application at locations within the output data corresponding to the temporal sequence of the application user inputs relative to the corresponding computer system application outputs, the output parameter field data being generated from user selections of those locations within the displayed interaction data;
  generating, using data processing logic of the computer system, association data representing respective user selected associations between said locations within said output data and said labels for said output parameters; and
  determining, based on the association data, corresponding second values for said output parameters from subsequent output of said computer system application.

39. An automation computer system, comprising a training component having a data processing device configured to:
  record, at a first time, a sequence of interactions between an initial execution of a computer system application and a user of the computer system application, the recorded sequence of interactions including outputs of the computer system application displayed to the user of the computer system application during the initial execution and application user inputs provided by the user of the computer system application in response to the displayed outputs to initiate application functions during the initial execution of the computer system application, the application user inputs including at least one of:
    one or more keystrokes selecting one or more options provided by the computer system application, the keystrokes being additional to entering alpha-numeric or symbolic data; and
    selections of options using an input device other than a keyboard,
  the application user inputs further representing first values for input parameters of the computer system application;
  at a second time subsequent to the first time, display interaction data representing the recorded interactions, including (i) the recorded outputs of the computer system application displayed to the user of the computer system application during the initial execution of the computer system application, and (ii) the application user inputs provided by the user of the computer system application during the initial execution of the computer system application in response to the displayed outputs, the application user inputs being displayed at the second time interspersed within the recorded output of the computer system application at locations within the recorded interactions corresponding to the temporal sequence of the application user inputs relative to the corresponding computer system application outputs;
  receive parameter field data representing the locations of the application user inputs within the recorded interactions, the parameter field data being generated from user selections of those locations within the displayed interaction data;
  access parameter label data representing respective labels for the input parameters of the computer system application;
  generate association data representing respective user selected associations between the labels for the input parameters and the respective locations within the recorded interactions to provide second values for the input parameters;
  store the association data and at least the recorded application outputs on at least one computer-readable storage medium;
  automatically generate an ordered sequence of inputs at a third time subsequent to the second time based on the association data and at least the recorded application outputs to provide the ordered sequence of inputs to the interactive computer system application without user interaction.

40. An automation computer system as claimed in claim 39, wherein the training component is further configured to:
  receive output parameter label data representing one or more labels for respective output parameters of said computer system application;
  receive output data representing output generated by said computer system application for display to the user of said computer system application, said output data including output parameter value data representing one or more values for said one or more output parameters;
  receive output parameter field data identifying one or more locations of the of respective application outputs with the recorded interactions, the output parameter field data being generated from user selections of the displayed interaction data; and
  generate output association data representing one or more associations between said locations within said recorded interactions and said labels for said output parameters for use in determining corresponding second values for said output parameters from subsequent output of said computer system application.

41. An automation computer system as claimed in claim 39, including an execution component configured to:
  access the association data and recorded application outputs;
  automatically generate an ordered sequence of inputs for the computer system application by merging the recorded interactions and the second values for said input parameters, wherein each second value for at least some of the input parameters provided in response to receipt of respective ones of the outputs of the computer system application; and
  automatically send the generated ordered sequence of inputs to said computer system application to at least partly automate said computer system application.

42. An automation computer system as claimed in claim 41, wherein the execution component is further configured to:
  receive output data representing output generated by said computer system application, said output data including output parameter value data representing one or more first values for respective output parameters of said computer system application;
  access output association data representing associations between said one or more output parameters and respective locations of said output parameters within said recorded interactions; and
  process said output data and said output association data to determine said one or more second values for said one or more output parameters.

43. A non-transitory computer-readable storage medium having stored thereon programming instructions configured to cause at least one programmable processor to:
  record, at a first time, a sequence of interactions between an initial execution of a computer system application and a user of the computer system application, the recorded sequence of interactions including outputs of the computer system application displayed to the user of the computer system application during the initial execution and application user inputs provided by the user of the computer system application in response to the displayed outputs to initiate application functions during the initial execution of the computer system application, the application user inputs including at least one of:
    one or more keystrokes selecting one or more options provided by the computer system application, the keystrokes being additional to entering alpha-numeric or symbolic data; and
    selections of options using an input device other than a keyboard,
    the application user inputs further representing first values for input parameters of the computer system application;
  at a second time subsequent to the first time, display interaction data representing the recorded interactions, including (i) the recorded outputs of the computer system application displayed to the user of the computer system application during the initial execution of the computer system application, and (ii) the application user inputs provided by the user of the computer system application during the initial execution of the computer system application in response to the displayed outputs, the application user inputs being displayed at the second time interspersed within the recorded output of the computer system application at locations within the recorded interactions corresponding to the temporal sequence of the application user inputs relative to the corresponding computer system application outputs;
  receive parameter field data representing the locations of the application user inputs within the recorded interactions, the parameter field data being generated from user selections of those locations within the displayed interaction data;
  access parameter label data representing respective labels for the input parameters of the computer system application;
  generate association data representing respective user selected associations between the labels for the input parameters and the respective locations within the recorded interactions to provide second values for the input parameters;
  store the association data and at least the recorded application outputs on at least one computer-readable storage medium;
  automatically generate an ordered sequence of inputs at a third time subsequent to the second time based on the association data and at least the recorded application outputs to provide the ordered sequence of inputs to the interactive computer system application without user interaction.

44. A non-transitory computer-readable storage medium as claimed in claim 43, including further programming instructions configured to cause at least one programmable processor to:
  receive output parameter label data representing one or more labels for respective output parameters of said computer system application;
  receive output data representing output generated by said computer system application for display to the user of said computer system application, said output data including output parameter value data representing one or more values for said one or more output parameters;
  receive output parameter field data identifying one or more locations of the of respective application outputs within the recorded interactions, the output parameter field data being generated from user selections of the displayed interaction data; and
  generate output association data representing one or more associations between said locations within said recorded interactions and said labels for said output parameters for use in determining corresponding second values for said output parameters from subsequent output of said application.

45. A non-transitory computer-readable storage medium as claimed in claim 43, including further programming instructions configured to cause at least one programmable processor to:
  access the association data and recorded application outputs;
  automatically generate an ordered sequence of inputs for the computer system application by merging the recorded interactions and the second values for said input parameters, wherein each second value for at least some of the input parameters provided in response to receipt of respective ones of the outputs of the computer system application; and
  automatically send the generated ordered sequence of inputs to said computer system application to at least partly automate said computer system application.

46. A non-transitory computer-readable storage medium as claimed in claim 45, including further programming instructions configured to cause at least one programmable processor to:
  receive output data representing output generated by said computer system application, said output data including output parameter value data representing one or more first values for respective output parameters of said computer system application;

access output association data representing associations between said one or more output parameters and respective locations of said output parameters within said recorded interactions; and process said output data and said output association data to determine said one or more second values for said one or more output parameters.

* * * * *